(12) United States Patent
Men

(10) Patent No.: US 6,575,670 B2
(45) Date of Patent: Jun. 10, 2003

(54) CUTTING TOOL ASSEMBLY AND CUTTING INSERT THEREFOR

(75) Inventor: Yuri Men, Haifa (IL)

(73) Assignee: Iscar, Ltd., Tefen (IL)

(*) Notice: Subject to any disclaimer, the term of this patent is extended or adjusted under 35 U.S.C. 154(b) by 0 days.

(21) Appl. No.: 09/927,473

(22) Filed: Aug. 13, 2001

(65) Prior Publication Data

US 2002/0001510 A1 Jan. 3, 2002

Related U.S. Application Data

(63) Continuation of application No. PCT/IL00/00093, filed on Feb. 20, 2000.

(30) Foreign Application Priority Data

Feb. 22, 1999 (IL) .................................................. 128649

(51) Int. Cl.⁷ .............................. B23B 27/14; B26D 1/12
(52) U.S. Cl. ............................ 407/42; 407/54; 407/115; 407/114
(58) Field of Search ............................. 407/35, 40, 42, 407/54, 113, 114, 63, 62, 65, 115, 116, 117

(56) References Cited

U.S. PATENT DOCUMENTS

| | | | | |
|---|---|---|---|---|
| 349,475 A | * | 9/1886 | Barclay | 407/64 |
| 3,128,804 A | * | 4/1964 | Scott | 83/855 |
| 4,437,802 A | * | 3/1984 | Hall, Jr. | 408/197 |
| 4,525,109 A | | 6/1985 | Bylund | 407/36 |
| 4,525,110 A | | 6/1985 | Stojanovski | 407/40 |
| 4,588,331 A | * | 5/1986 | Yoshinori | 407/113 |
| 4,709,737 A | * | 12/1987 | Jonsson | 144/241 |
| 5,158,401 A | * | 10/1992 | Pawlik | 407/40 |
| 5,228,812 A | | 7/1993 | Noguchi et al. | 408/144 |
| 5,772,364 A | * | 6/1998 | Satran et al. | 407/113 |
| 5,904,448 A | * | 5/1999 | Lee et al. | 407/42 |
| 5,915,888 A | * | 6/1999 | Minicozzi | 407/113 |
| 5,924,824 A | * | 7/1999 | Satran et al. | 407/34 |
| 5,931,613 A | * | 8/1999 | Larsson | 407/103 |
| 6,024,519 A | * | 2/2000 | Okui et al. | 407/113 |
| 6,102,630 A | * | 8/2000 | Flolo | 407/42 |
| 6,196,769 B1 | * | 3/2001 | Satran et al. | 407/40 |
| 6,244,790 B1 | * | 6/2001 | Kingdom | 407/110 |

FOREIGN PATENT DOCUMENTS

| | | | | |
|---|---|---|---|---|
| EP | 0 842 723 A1 | | 5/1998 | |
| JP | 63-34003 | * | 2/1988 | 407/30 X |
| JP | 1-310808 | * | 12/1989 | 407/115 X |

OTHER PUBLICATIONS

PCT/IL 00/00093—PCT International Search Report dated Jun. 5, 2000.
PCT International Preliminary Examination Report dated Feb. 13, 2001 for PCT/IL00/00093.

* cited by examiner

Primary Examiner—Henry W. H. Tsai
(74) Attorney, Agent, or Firm—Pennie & Edmonds LLP

(57) ABSTRACT

A cutting insert holder has a lower clamping jaw resiliently connected to an upper clamping jaw. The upper clamping jaw is provided with two elongated spaced apart parallel grooves. The cutting insert is retained in the cutting insert holder by means of a screw which passes through a through bore in the upper jaw of the insert holder, through a through bore in the cutting insert and is threadingly engaged into a threaded bore in the lower clamping jaw. The two elongated ridges in the upper surface of the cutting insert cooperate with the two elongated parallel grooves in the lower surface of the upper clamping jaw.

32 Claims, 8 Drawing Sheets

CUTTING TOOL ASSEMBLY AND CUTTING INSERT THEREFOR

RELATED APPLICATIONS

This is a Continuation of the National Stage Designation of PCT/IL00/00093, filed Feb. 20, 2000.

FIELD OF THE INVENTION

This invention relates generally to a cutting tool and more particularly to a ball nose end mill, and an arrangement for retaining a replaceable cutting insert therein, especially an indexable cutting insert.

BACKGROUND OF THE INVENTION

In conventional ball nose end mills cutting inserts are clamped in position by a retaining screw. A problem with this arrangement is that the accuracy of the initial location of the cutting edge of a cutting insert retained in the end mill is dependent on the accuracy with which the retaining screw is located in the end mill. Any play or clearance between the screw and the cutting insert results in a corresponding inaccuracy in the location of the cutting edge of the cutting insert.

A solution to this problem is proposed in U.S. Pat. No. 4,883,391, in accordance with which a clamping screw is provided with a cylindrical portion which is held in engagement with a cylindrical bore portion in the end mill. However, this solution calls for both a very accurately manufactured cylindrical portion on the screw and a correspondingly very accurately manufactured cylindrical bore portion in the end mill. Both of these requirements increase the cost of manufacture of the end mill as a whole. Furthermore, any inaccuracies introduced into these two cylindrical elements during use of the end mill, will introduce a corresponding inaccuracy in the location of the cutting edge of the cutting insert.

SUMMARY OF THE INVENTION

In accordance with the present invention there is provided a cutting tool assembly comprising a cutting insert holder and a cutting insert, the cutting insert holder comprising a clamping portion, at a front portion thereof, connected to a body portion;

the clamping portion comprising:
- a lower clamping jaw having a lower peripheral surface and an upper surface;
- an upper clamping jaw resiliently connected to the lower clamping jaw, the upper clamping jaw having a lower surface and an upper peripheral surface, the lower surface being provided with two elongated spaced apart substantially parallel grooves;
- a through bore passing through the upper and lower clamping jaws, the through bore being internally threaded in one of the upper or lower clamping jaws; and
- an insert receiving slot defined between the upper and lower clamping jaws; the cutting insert comprising:
- an upper surface provided with two elongated spaced apart substantially parallel ridges;
- a lower surface;
- a peripheral side surface between the upper surface and the lower surface, the peripheral side surface being provided with at least one cutting edge;
- a rake surface associated with the at least one cutting edge; and
- a through bore passing through the cutting insert, from the upper surface to the lower surface;

wherein the cutting insert is retained in the insert receiving slot in a retained position by means of a screw which passes through the through bore in the upper and lower jaws of the insert holder and through the through bore in the cutting insert, and wherein in the retained position at least a portion of the lower surface of the cutting insert abuts at least a portion of the upper surface of the lower clamping jaw and the two elongated ridges in the upper surface of the cutting insert cooperate with the two elongated parallel grooves in the lower surface of the upper clamping jaw.

In accordance with a preferred embodiment of the present invention, the cutting insert is provided with at least one elongated recess in the peripheral side surface of the cutting insert adjacent a portion of the lower surface, and the upper surface of the lower clamping jaw is provided with an insert location surface and at least a portion of a substantially upright surface of the at least one elongated recess in the peripheral side surface of the cutting insert abuts the insert location surface in the upper surface of the lower clamping jaw.

Also in accordance with the present invention there is provided a cutting insert comprising:
- an upper surface provided with two elongated spaced apart substantially parallel ridges;
- a lower surface;
- a peripheral side surface between the upper surface and the lower surface, the peripheral side surface being provided with at least one cutting edge;
- a rake surface associated with the at least one cutting edge; and
- a through bore passing through the cutting insert, from the upper surface to the lower surface.

Also in accordance with a preferred embodiment, the peripheral side surface of the cutting insert is provided with at least one elongated recess adjacent a portion of the lower surface.

In accordance with a preferred embodiment of the present invention, the two elongated grooves in the lower surface of the upper clamping jaw are located adjacent to and on either side of the through bore in the upper clamping jaw.

Further in accordance with a preferred embodiment of the present invention, the two elongated ridges in the upper surface of the cutting insert are located adjacent to and on either side of the through bore in the cutting insert Still further in accordance with a preferred embodiment of the present invention, each of the two elongated ridges in the upper surface of the cutting insert have an indentation in a portion thereof.

Yet still further in accordance with a preferred embodiment of the present invention, the indentation is in a region adjacent the through bore in the cutting insert.

In accordance with one specific application, the cutting insert is generally oval in shape in a top view and is provided with two diametrically opposite sets of cutting edges.

BRIEF DESCRIPTION OF THE DRAWINGS

For a better understanding the invention will now be described, by way of example only, with reference to the accompanying drawings in which.

DETAILED DESCRIPTION OF THE INVENTION

Figure 1:
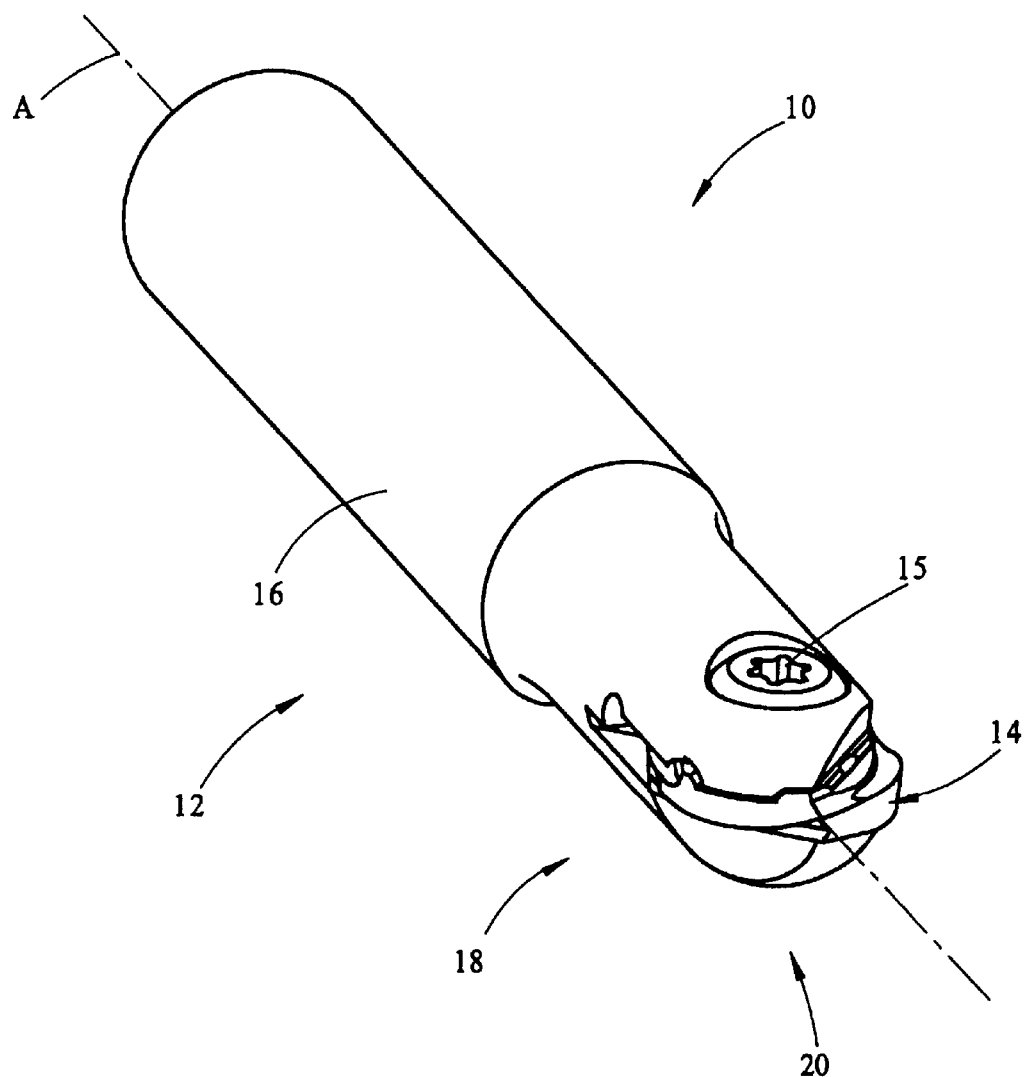
FIG. 1 is a perspective view of a cutting tool assembly according to the present invention.
Figure 2:
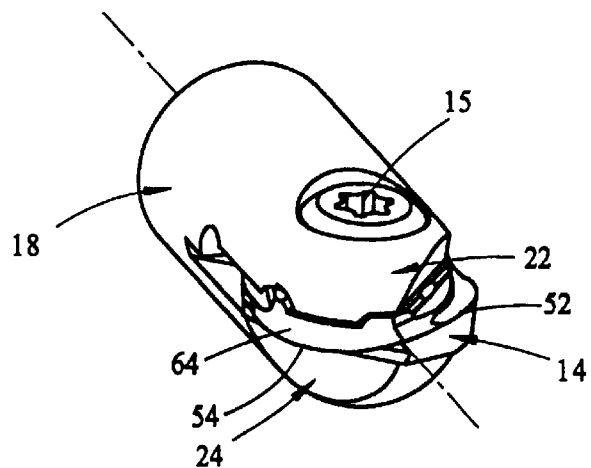
FIG. 2 is a perspective view of the front portion of the cutting tool assembly of FIG. 1.
Figure 3:
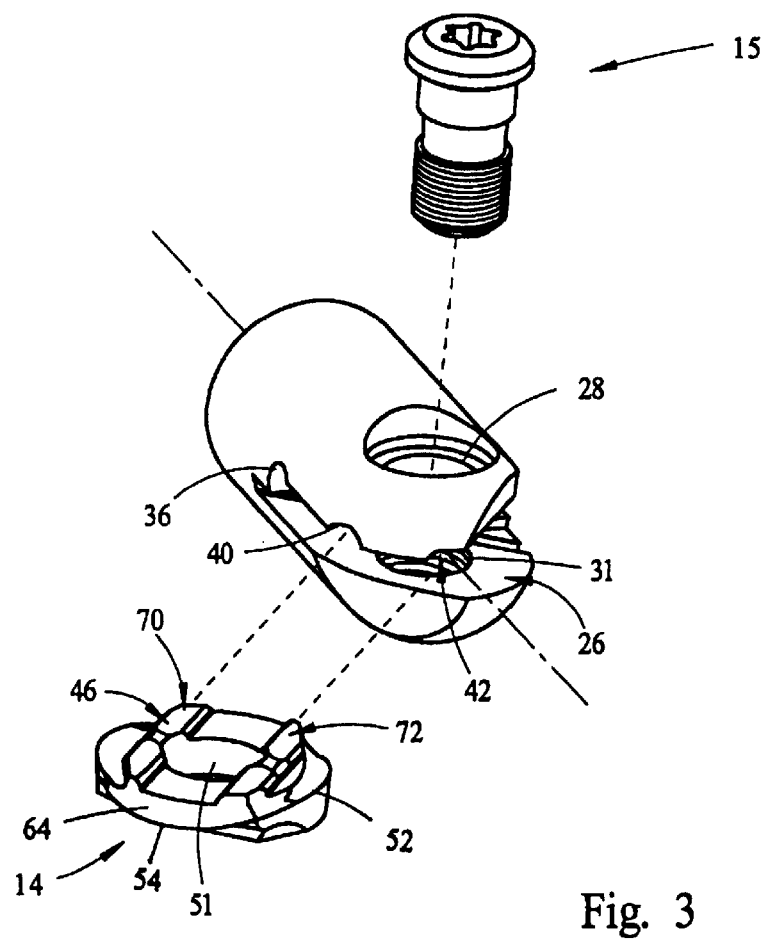
FIG. 3 is an exploded view of the cutting tool assembly of FIG. 2.
Figure 4:
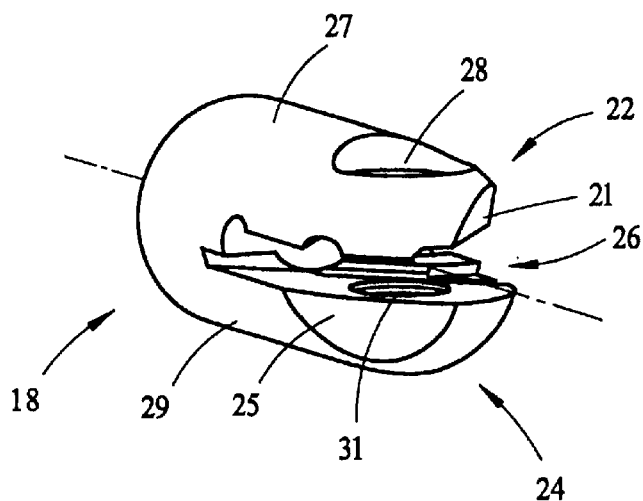
FIG. 4 is a perspective view of the cutting insert holder according to the present invention.
Figure 5:
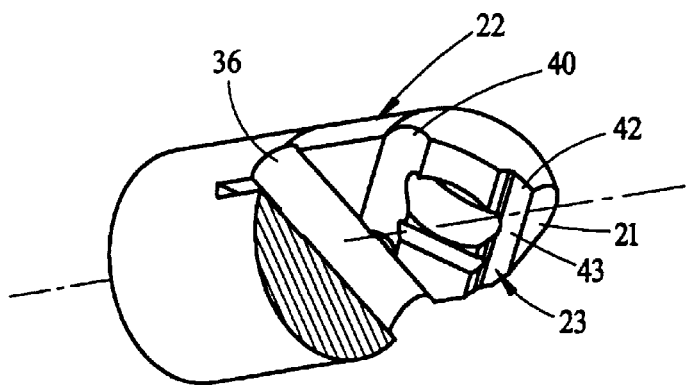
FIG. 5 is a bottom perspective view of the cutting insert holder of FIG. 4 with the lower clamping jaw removed for clarification purposes.
Figure 6:
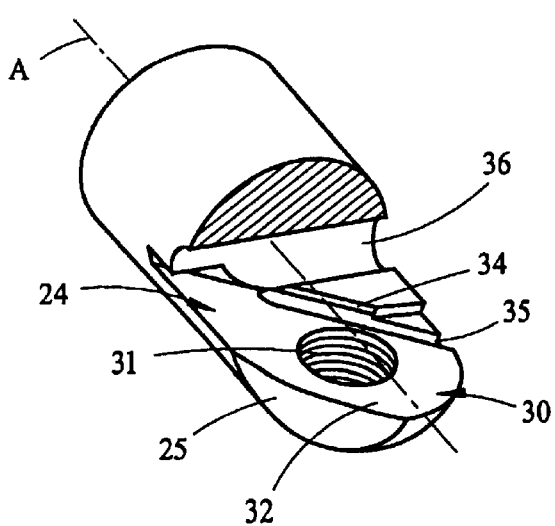
FIG. 6 is a top perspective view of the cutting insert holder of FIG. 4 with the upper clamping jaw removed for clarification purposes.
Figure 7:
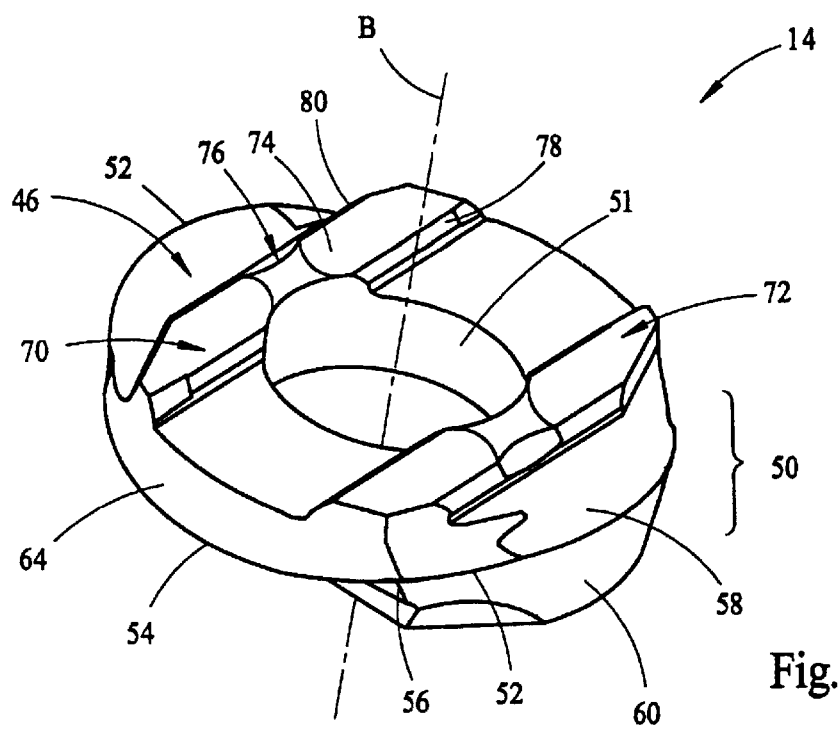
FIG. 7 is a top perspective view of the cutting insert according to the present invention.
Figure 8:
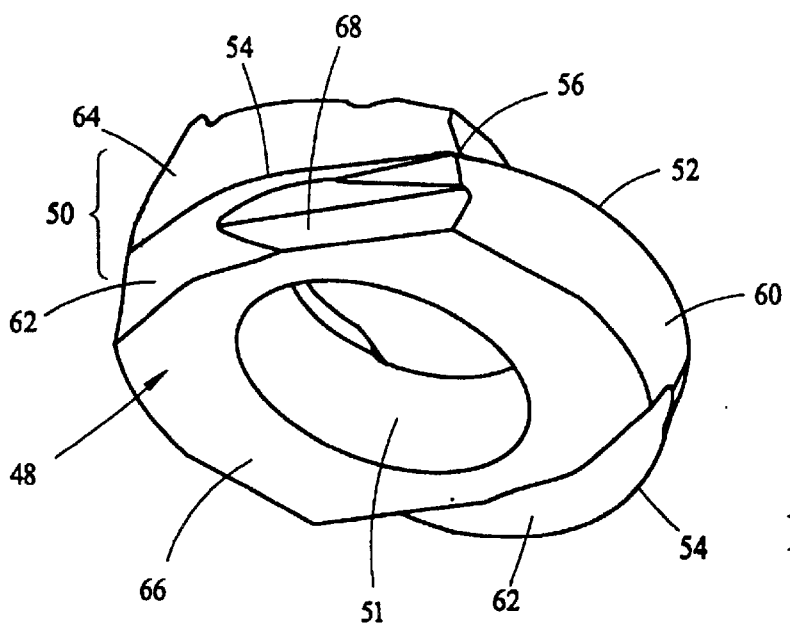
FIG. 8 is a bottom perspective view of the cutting insert according to the present invention.
Figure 9:
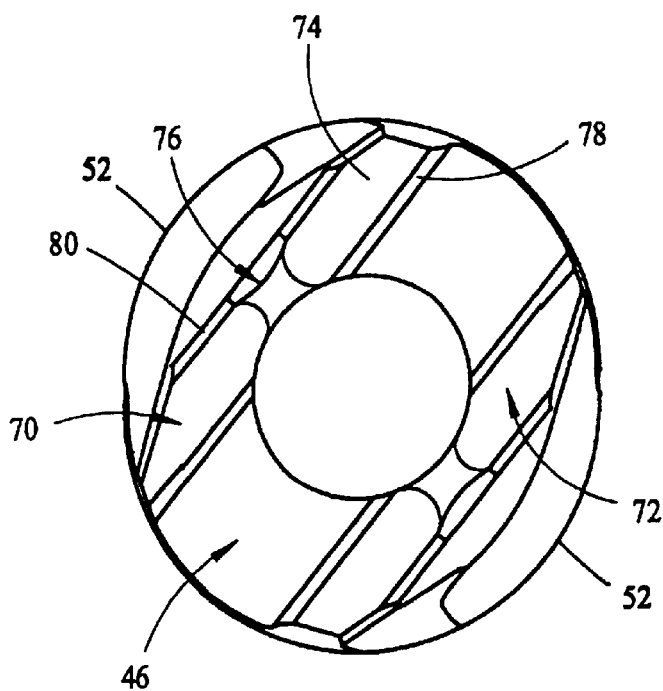
FIG. 9 is a top view of the cutting insert according to the present invention.
Figure 10:
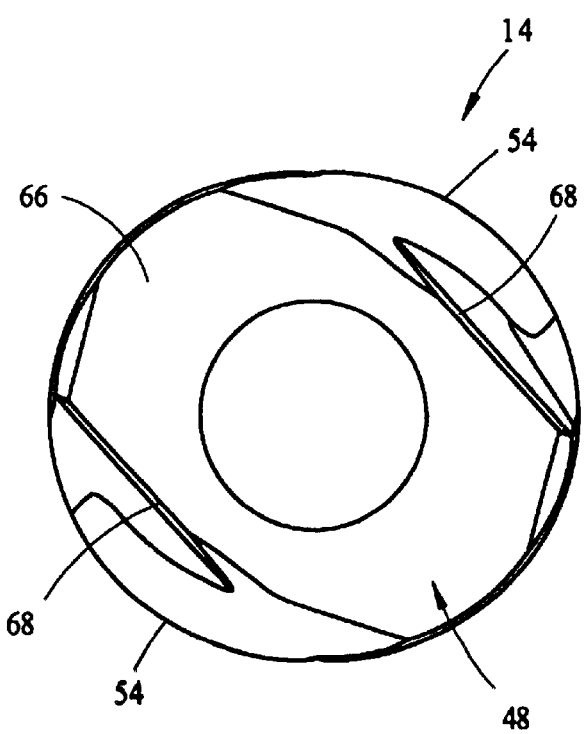
FIG. 10 is a bottom view of the cutting insert according to the present invention.
Figure 11:
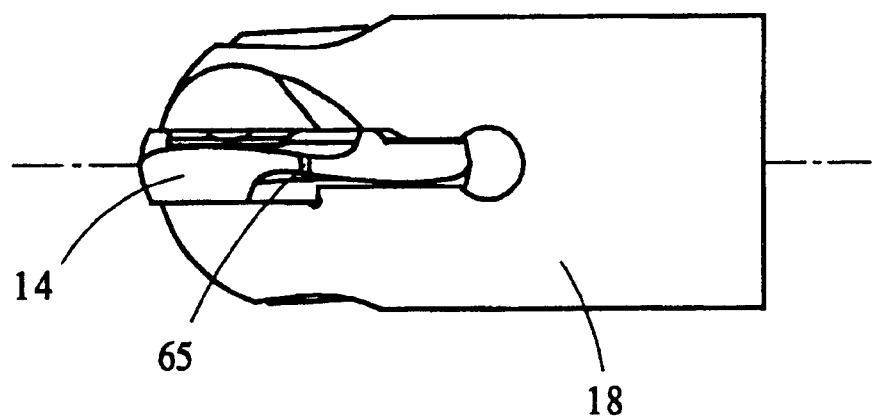
FIG. 11 is a side view of the cutting tool assembly of FIG. 2.
Figure 12:
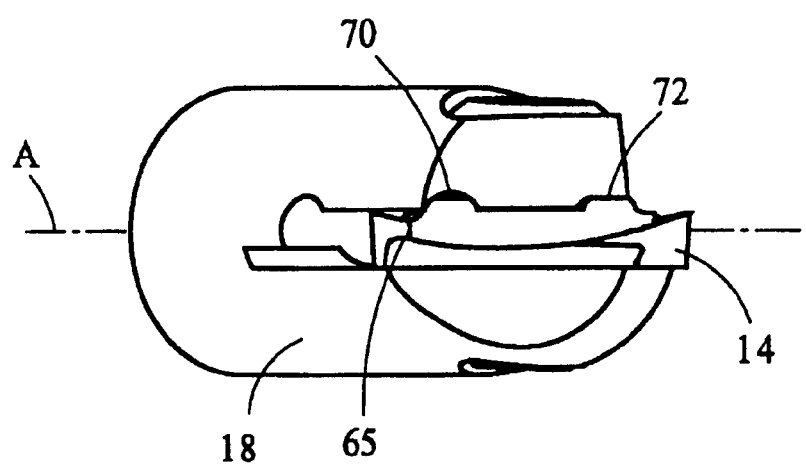
FIG. 12 is a view of the cutting tool assembly of FIG. 2 in a direction along a line parallel to and passing between the grooves in the upper clamping jaw.

Attention is first drawn to FIGS. 1 to 6. As shown, a cutting tool assembly 10 having an axis of rotation A comprises a cutting insert holder 12 and a cutting insert 14 mounted therein and secured by a screw 15. The cutting insert holder 12 comprises an elongated cylindrical body portion 16 and a clamping portion 18 in a front portion 20 thereof. The clamping portion 18 consists of an upper clamping jaw 22 separated from a lower clamping jaw 24 by an insert receiving slot 26. The upper clamping jaw 22 has an upper peripheral surface 27, having a chip evacuation recess 21 in a front portion thereof, a lower surface 23 and a substantially radially directed through bore 28. The lower clamping jaw 24 has a lower peripheral surface 29, having a chip evacuation recess 25 in a front portion thereof, an upper surface 30 and a substantially radially directed threaded bore 31 which is aligned with the through bore 28 in the upper clamping jaw. The upper surface 30 has a base abutment surface 32 constituting a clamping region and a rear abutment surface 34, constituting an insert location surface, that is slanted with respect to the longitudinal axis A and directed substantially perpendicular to the base abutment surface 32. Shown in the figure is a channel 35 that separates the rear abutment surface 34 from the base abutment surface 32. It should be noted that the channel 35 is created during the manufacturing process and is not an essential feature of the lower clamping jaw 24. At the rear of the insert receiving slot 26 is a flexibilizing bore 36 which is transversely directed to the longitudinal axis A and merges with the upper clamping jaw 22 and the lower clamping jaw 24 creating a resilient connection between the two jaws.

The lower surface 23 of the upper clamping jaw 22 has a semi cylindrical groove 40, which, when viewed from the top of the cutting insert holder 12, is directed preferably perpendicular to the rear abutment surface 34, and an open sided groove 42 which is parallel to the groove 40. The upper surface 43 of the groove 42 constitutes a top front abutment surface.

Attention is now drawn to FIGS. 7 to 11. The cutting insert 14 has a flat disc like body with an axis of rotational symmetry B, an upper surface 46, a lower surface 48 and a peripheral side surface 50 connecting between the upper surface 46 and the lower surface 48. A through bore 51 aligned with the axis B passes through the cutting insert 14.

The peripheral side surface 50 has two identical sets of cutting edges. Each set of cutting edges consists of an upper cutting edge 52 and a lower cutting edge 54. The upper cutting edge 52 meets with the lower cutting edge 54 at apex 56. The upper cutting edge 52 has a rake surface 58 and a relief surface 60. The lower cutting edge 54 has a rake surface 62 and a relief surface 64. In the region between the two apexes 56, on diametrically opposite sides of the peripheral side surfaces 50, the relief surface 60 of each set of cutting edges merges with the relief surface 64 of the other set of cutting edges at merging regions 65 (see FIG. 11).

The lower surface 48 of the cutting insert has a bottom abutment surface 66 and two identical symmetrically disposed rear abutment surfaces 68 directed substantially perpendicular to the bottom abutment surface 66. On each side of the lower surface 48 of the cutting insert, the rake surface 62 together with rear abutment surface 68 form an elongated recess in a portion of the peripheral side surface.

The upper surface 46 of the cutting insert has two identical elongated parallelly extending ridges 70 and 72. The ridges 70 and 72 are directed substantially perpendicular to the rear abutment surfaces 68 when viewing the cutting insert 14 from the top. The ridge 70 is identical to the ridge 72 and therefore only one ridge will be described. The ridge 70 extends between the two relief surfaces 64 and has a flat top surface 74. The ridge 70 has an indentation 76 substantially in the middle thereof. The ridge 70 also has an inner side surface 78 and outer side surface 80, both of which are curved.

The assembly of the cutting tool assembly 10 will now be described, primarily with reference to FIGS. 13 to 16. The cutting insert 14 is inserted into the insert receiving slot 26 such that the upper surface 46 of the cutting insert 14 is facing towards the lower surface 23 of the upper clamping jaw 22, the ridge 70 is introduced into and parallel to the groove 40, and the ridge 72 is introduced into and parallel to the groove 42. In this position the cutting insert 14 is slid into the insert receiving slot 26 till a rear abutment surface 68 of the cutting insert abuts against the rear abutment surface 34 of the upper surface 30 of the lower clamping jaw 24. Now, the screw 15 (not shown in FIGS. 13 to 16) is inserted into the through bore 28 of the upper clamping jaw 22, through the through bore 51 of the cutting insert 14, and threadingly engaged into the threaded bore 31 of the lower clamping jaw 24.

Figure 13:
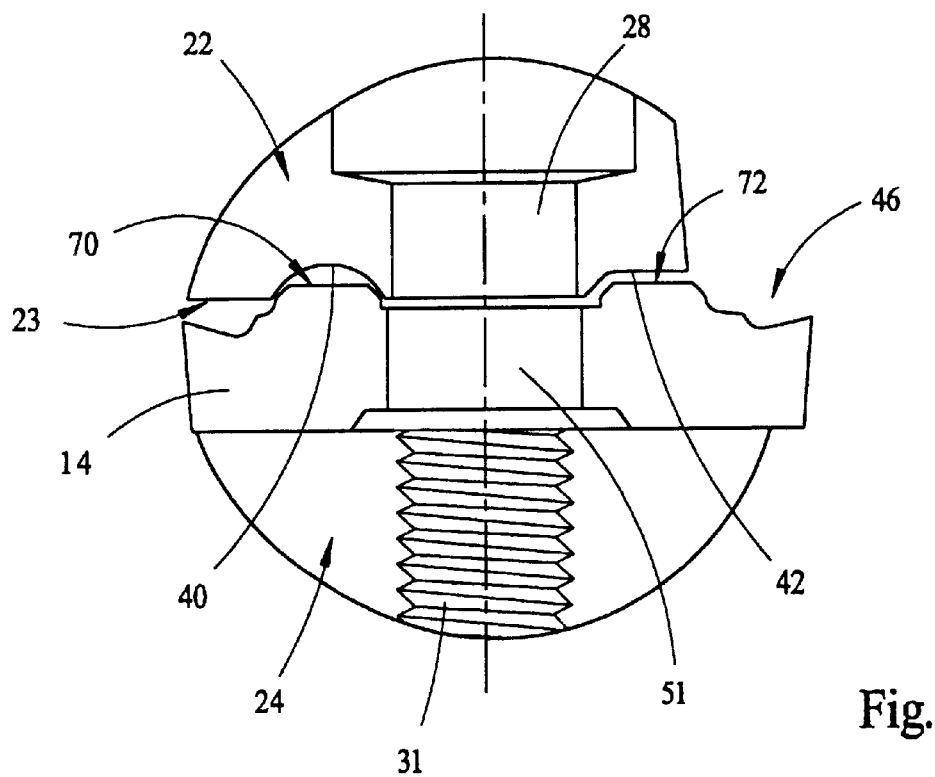
FIG. 13 is an enlarged cross sectional view of the cutting tool assembly of FIG. 2 taken in a plane passing through and perpendicular to the ridges in the upper surface of the cutting insert, showing the relative position between the cutting insert and the clamping portion prior to tightening the screw, which is not shown for the sake of clarification.
Figure 14:
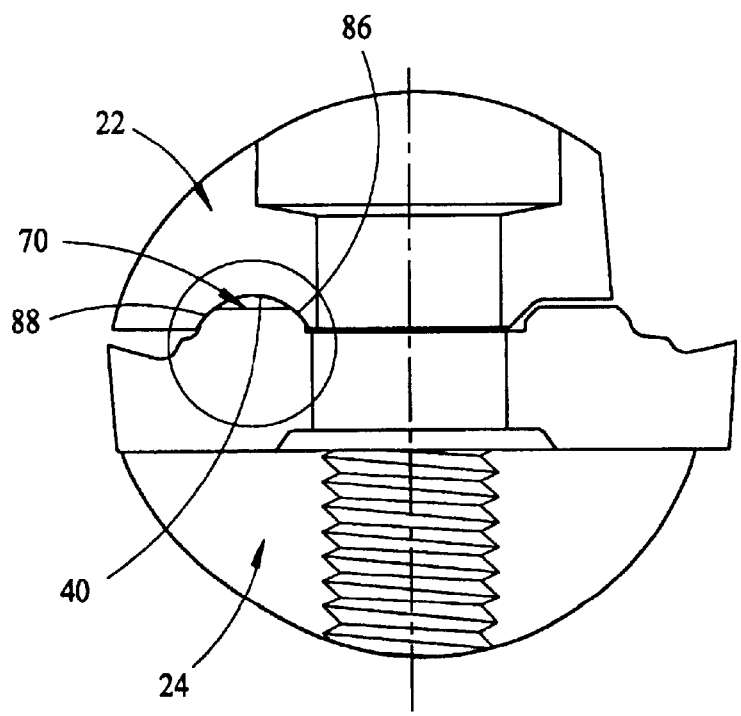
FIG. 14 is a cross sectional view of the cutting tool assembly as in FIG. 13 but showing the situation in the first stage of tightening the screw.
Figure 15:
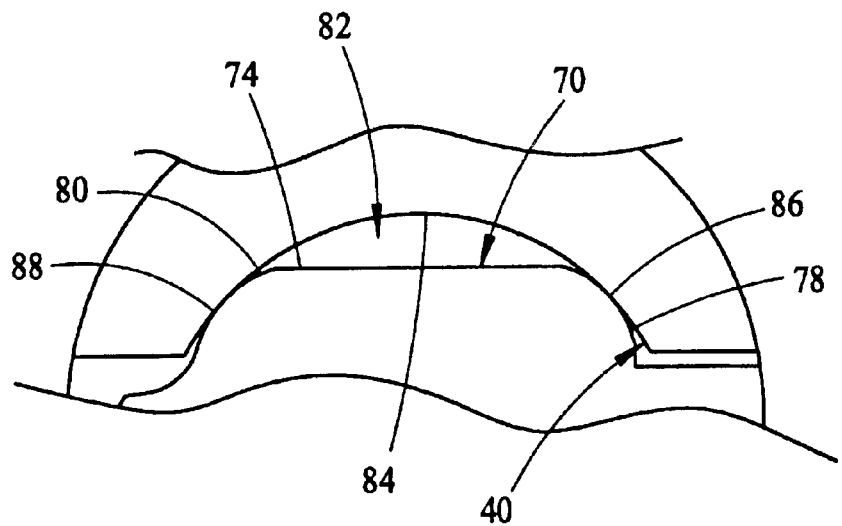
FIG. 15 is an enlarged detail of the circled portion in FIG. 14.
Figure 16:
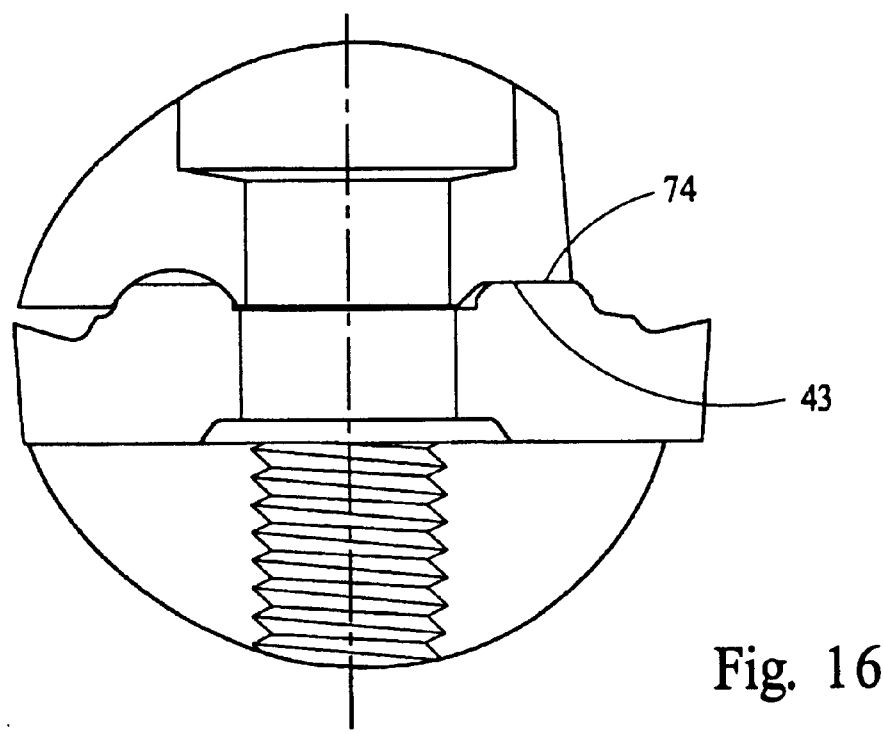
FIG. 16 is a cross sectional view of the cutting tool assembly as in FIG. 13 but showing the situation in the final stage of tightening the screw.

The tightening of the screw 15 can conveniently be considered as a two stage process in the clamping of the insert. FIG. 13 shows the relative position between the cutting insert 14 and the clamping portion 18 prior to tightening of the screw 15. In the first stage of tightening, as shown in FIG. 14, the upper clamping jaw 22 and the lower clamping jaw 24 approach each other. At this stage the ridge 70 abuts the inner surface of the groove 40. Due to the difference in the cross sectional shape between the ridge 70 and the groove 40 a clearance 82 is formed between the upper region 84 of the groove 40 and the top surface 74 of the ridge 70. Due to this clearance the ridge 70 abuts the groove 40 along front abutment region 86 and rear abutment region 88. The front abutment region 86 coincides generally with a line along the inner side surface 78 and the rear abutment region 88 coincides generally with a line along the outer side surface 80. Because of the indentation 76 in the ridge 70 the front and rear abutment regions are both divided into two portions. In the second and final stage of the tightening of the screw (as shown in FIG. 16) the upper surface 43 of the groove 42 abuts the flat top surface 74 of the ridge 72.

As a result, the cutting insert 14 is retained in a firm and precise manner in the insert holder with the ridge 70 wedged into the groove 40, the ridge 72 clamped by the upper surface 43 of the groove 42 and the rear abutment surface 68 of the insert abutting against the rear abutment surface 34 of the upper surface 30 of the lower clamping jaw 24.

Although the present invention has been described to a certain degree of particularity, it should be understood that various alterations and modifications can be made without departing from the spirit or scope of the invention as hereinafter claimed.

What is claimed is:

1. A cutting tool assembly comprising a cutting insert holder and a cutting insert, the cutting insert holder comprising a clamping portion, at a front portion thereof, connected to a body portion;
   the clamping portion comprising:
      a lower clamping jaw having a lower peripheral surface and an upper surface;
      an upper clamping jaw resiliently connected to the lower clamping jaw, the upper clamping jaw having a lower surface and an upper peripheral surface, the lower surface being provided with two elongated spaced apart substantially parallel grooves;
      a through bore passing through the upper and lower clamping jaws, the through bore being internally threaded in at least one of the upper and lower clamping jaws; and
      an insert receiving slot defined between the upper and lower clamping jaws; the cutting insert comprising:
         an upper surface provided with two elongated spaced apart substantially parallel ridges;
         a lower surface;
         a peripheral side surface between the upper surface and the lower surface, the peripheral side surface being provided with at least one cutting edge;
         a rake surface associated with the at least one cutting edge; and
         a through bore passing through the cutting insert, from the upper surface to the lower surface;
      wherein the cutting insert is retained in the insert receiving slot in a retained position by means of a screw which passes through the through bore in the upper and lower jaws of the insert holder and through the through bore in the cutting insert, and wherein in the retained position at least a portion of the lower surface of the cutting insert abuts at least a portion of the upper surface of the lower clamping jaw and the two elongated ridges in the upper surface of the cutting insert are positioned in the two elongated parallel grooves in the lower surface of the upper clamping jaw.

2. The cutting tool assembly according to claim 1, wherein:
   the cutting insert is provided with at least one elongated recess in the peripheral side surface of the cutting insert adjacent a portion of the lower surface;
   the upper surface of the lower clamping jaw is provided with an insert location surface; and
   at least a portion of a substantially upright surface of the at least one elongated recess in the peripheral side surface of the cutting insert abuts the insert location surface in the upper surface of the lower clamping jaw.

3. The cutting tool assembly according to claim 1, wherein at least the upper clamping jaw has a chip evacuation recess in a front portion thereof.

4. The cutting tool assembly according to claim 1, wherein the two elongated grooves in the lower surface of the upper clamping jaw are located adjacent to and on either side of the through bore in the upper clamping jaw.

5. The cutting tool assembly according to claim 1, wherein the two elongated ridges in the upper surface of the cutting insert are located adjacent to and on either side of the through bore in the cutting insert.

6. The cutting tool assembly according to claim 1, wherein each of the two elongated ridges in the upper surface of the cutting insert have an indentation in a portion thereof.

7. The cutting tool assembly according to claim 6, wherein the indentation is in a region adjacent the through bore in the cutting insert.

8. The cutting tool assembly according to claim 1, wherein the cutting insert is generally oval in shape in a top view and is provided with two diametrically opposite sets of cutting edges.

9. The cutting tool assembly according to claim 1, wherein the upper surface comprises a substantially flat clamping region.

10. The cutting tool assembly according to claim 1, wherein the cutting tool assembly has an axis of rotation (A) and the elongated spaced apart substantially parallel grooves are transverse to said axis of rotation (A).

11. The cutting tool assembly according to claim 1, wherein said at least one cutting edge is spaced apart from said ridges.

12. A cutting insert comprising:
   an upper surface provided with two elongated spaced apart substantially parallel ridges;
   a lower surface;
   a peripheral side surface between the upper surface and the lower surface, the peripheral side surface comprising a rake surface and a relief surface and at least one cutting edge formed at an intersection of the rake and relief surfaces; and
   a through bore passing through the cutting insert, from the upper surface to the lower surface;
   wherein said at least one cutting edge is spaced apart from said ridges.

13. The cutting insert according to claim 12, wherein the peripheral side surface of the cutting insert is provided with at least one elongated recess adjacent a portion of the lower surface.

14. The cutting insert according to claim 12, wherein the two elongated ridges in the upper surface of the cutting insert are located adjacent to and on either side of the through bore in the cutting insert.

15. The cutting insert according to claim 12, wherein each of the two elongated ridges in the upper surface of the cutting insert have an indentation in a portion thereof.

16. The cutting insert according to claim 15, wherein the indentation is in a region adjacent the through bore in the cutting insert.

17. The cutting insert according to claim 12, wherein the cutting insert is generally oval in shape in a top view and is provided with two diametrically opposite sets of cutting edges.

18. The cutting insert according to claim 12, wherein the peripheral side surface of the cutting insert is provided with a pair of spaced apart rear abutment surfaces, the ridges on the upper surface being directed substantially perpendicular to said rear abutment surfaces.

19. The cutting insert according to claim 12 wherein the cutting insert has an axis of rotational symmetry (B) and the through bore is coaxially aligned with said axis of rotational symmetry (B).

20. The cutting insert according to claim 12, wherein said ridges are separated by a recessed region, the through bore being located in the recessed region.

21. A cutting insert comprising:
an upper surface provided with two elongated spaced apart substantially parallel ridges;
a lower surface;
a peripheral side surface between the upper surface and the lower surface, the peripheral side surface comprising a rake surface and a relief surface and at least one cutting edge formed at an intersection of the rake and relief surfaces; and
a through bore passing through the cutting insert, from the upper surface to the lower surface;
wherein the ridges are identical to one another, and said at least one cutting edge is spaced apart from said ridges.

22. The cutting insert according to claim 21, wherein the inner and outer side surfaces of each ridge are curved, and each ridge has a flat top surface.

23. The cutting insert according to claim 21, wherein the lower surface is dissimilar in construction to the upper surface.

24. The cutting insert according to claim 21, wherein the cutting insert has an axis of rotational symmetry (B) and the through bore is coaxially aligned with said axis of rotational symmetry (B).

25. A cutting insert comprising:
an upper surface provided with two elongated spaced apart substantially parallel ridges;
a lower surface;
a peripheral side surface between the upper surface and the lower surface, the peripheral side surface comprising a rake surface, a relief surface, at least one cutting edge formed at an intersection of the rake and relief surfaces, and at least one elongated recess adjacent a portion of the lower surface; and
a through bore passing through the cutting insert, from the upper surface to the lower surface;
wherein said at least one cutting edge is spaced apart from said ridges.

26. The cutting insert according to claim 25, wherein the cutting insert has an axis of rotational symmetry (B) and the through bore is coaxially aligned with the axis of rotational symmetry (B).

27. The cutting insert according to claim 25, wherein the cutting insert is generally oval in shape in a top view.

28. The cutting insert according to claim 25, wherein the cutting insert is provided with two diametrically opposite sets of cutting edges.

29. The cutting insert according to claim 25, wherein the two elongated spaced apart substantially parallel ridges are identical to one another.

30. The cutting insert according to claim 25, wherein the peripheral side surface of the cutting insert is provided with a pair of spaced apart rear abutment surfaces, the ridges on the upper surface being directed substantially perpendicular to the rear abutment surfaces.

31. The cutting insert according to claim 25,
wherein only the upper surface is provided with two elongated spaced apart substantially parallel ridges; and
wherein the peripheral side surface is provided with a pair of spaced apart rear abutment surfaces, the ridges on the upper surface being directed substantially perpendicular to said rear abutment surfaces.

32. The cutting insert according to claim 25, wherein said ridges are separated by a recessed region, the through bore being located in the recessed region.

* * * * *